2,874,139
SILICA-FILLED POLYCAPROAMIDE

Norman Kendall Jelinger Symons, Wilmington, Del., assignor to E. I. du Pont de Nemours and Company, Wilmington, Del., a corporation of Delaware No Drawing. Application July 21, 1954
Serial No. 444,912

1 Claim. (Cl. 260—37)

This invention relates to silica-filled synthetic polyamide resin compositions, and to methods and materials which may be used in preparing them. The invention is particularly concerned with the preparation of polycarbonamide resin compositions containing silica in especially well-dispersed finely-divided form, and with the preparation of novel silica-filled polycarbonamide resin compositions having increased stiffness and melt viscosity as compared to corresponding unfilled polymers.

Finely divided inorganic fillers, such as silica, having a maximum particle size of less than about 10 microns, have hitherto been incorporated into polyamide resins so as to produce relatively homogenous filled compositions. Conventionally these fillers have been introduced for such purposes as coloring or delustering the resin. It has not previously been known however to produce attractive polyamide resin compositions having markedly increased stiffness and melt viscosity by the incorporation of such finely divided fillers. Compositions containing enough of such fillers to affect these properties have been vastly inferior in strength and toughness as compared to the unfilled resins, and have therefore not been attractive.

Various procedures have been developed for incorporating these fillers. One method involves mechanically mixing the filler particles into the molten resin. This method however entails high power costs and expensive machinery, and is therefore not particularly attractive. A more convenient method involves polymerizing the dry polycarbonamide-forming ingredients in uniform admixture with the filler particles in a stirred autoclave, as disclosed in U. S. Patent 2,205,722. Use of dry ingredients however makes it difficult to transfer the necessary heat into the mass so as to bring about polymerization, and also involves high power costs for the stirring. Accordingly, the preferred prior art incorporation procedures involve dispersing the filler into a fluid aqueous solution of polyamide-forming substance and heating the resulting dispersion under polyamide-forming conditions, as disclosed for example in U. S. Patents 2,278,878 and 2,341,759. However because of the pronounced tendency of especially finely divided silica particles, having maximum dimensions of less than about 200 millimicrons, to agglomerate in admixture with fluid aqueous solutions of polyamide-forming substance, it has not previously been known to produce stable uniform dispersions of such silica in these media. Moreover it has not previously been known to use these preferred incorporation procedures to produce polyamide resin compositions containing uniformly dispersed silica substantially entirely in the form of discrete particles having maximum dimensions of less than about 200 millimicrons.

It is an object of the present invention to provide novel polycarbonamide resin compositions having markedly increased stiffness and melt viscosity together with desirable strength and toughness. A further object is to provide novel polycarbonamide resin compositions containing uniformly distributed therein especially finely divided silica substantially entirely in the form of discrete particles having maximum dimensions of less than about 200 millimicrons. Yet another object is to provide an improved procedure for the preparation of silica-filled polycarbonamide resin compositions. An additional object is to provide novel stable dispersions of especially finely divided silica in a fluid aqueous solution of polycarbonamide-forming substance. Other objects will be apparent hereinafter.

According to the present invention it has been found that highly homogeneous polycarbonamide resin compositions having surprisingly high stiffness and melt viscosity together with high strength and toughness may be obtained by procedures hereinafter detailed which comprise broadly dispersing finely divided silica, having a maximum discrete particle size of less than 10 microns and a specific surface area of at least 15 square meters per gram, in a fluid aqueous solution of polycarbonamide-forming substance, and heating the dispersion under polycarbonamide-forming conditions, the silica being supplied in amount sufficient to provide a total siliceous surface of at least 3 square meters per gram of final composition, and the steps of dispersing and heating being carried out under conditions effective to prevent both agglomeration and sedimentation of the silica.

It has further been found that especially finely divided discrete silica particles having maximum dimensions of less than about 200 millimicrons, and a specific conductance of less than $5 \times 10^{-4}$ mho/cm., may be mixed with fluid aqueous solutions of polycarbonamide-forming substance without agglomeration or sedimentation to form stable dispersions while maintaining the specific conductance of the mixture below $2.3 \times 10^{-3}$ mho/cm.; that such dispersions may be heated to polycarbonamide-forming temperature without sedimentation or agglomeration while continuing to maintain the specific conductance of the dispersion below $2.3 \times 10^{-3}$ mho/cm.; and that the mass resulting from such heating may be further heated under conditions effective to drive off water and continue the polymerization to form polycarbonamide resin compositions containing uniformly dispersed finely-divided silica substantially entirely in the form of discrete particles having maximum dimensions of less than about 200 millimicrons. Inasmuch as discrete silica particles having average dimensions of less than about 200 millimicrons necessarily have a specific surface area of at least 15 square meters per gram, this procedure is particularly suitable for the preparation of the novel, stiff, viscous polycarbonamide resin compositions of the present invention. It may also be used with advantage to incorporate silica into polycarbonamide resins for the conventional purposes of the prior art so as to obtain compositions having an especially high degree of homogeneity.

In one preferred embodiment of the invention a substantially completely deionized silica sol containing two to twenty parts by weight of silica having a specific surface area of about 160 square meters per gram and substantially entirely in the form of discrete dense spherical particles having diameters in the range of 5 to 30 millimicrons is dispersed in a fluid solution consisting essentially of water and 98 to 80 parts by weight of polymer-grade 6-caprolactam. This dispersion is heated to polycarbonamide-forming temperatures with retention of water, and then subjected to a polymerization cycle involving further heating and removal of water to obtain a silica-filled polycarbonamide resin composition having an inherent viscosity of 0.9 or more. The specific conductance of the dispersion is thus maintained well below $2.3 \times 10^{-3}$ mho/cm. during the entire operation, and the final product contains the silica substantially entirely in the form of discrete particles of unchanged size, uniformly distributed within the polymer mass. Stiffness of the products as indicated by flexural modulus ranges from about 60 to 130 per cent higher, and melt viscosity from about 10 to 100 times higher, than that of similarly-prepared unfilled polymer, yet the products manifest high strength and toughness, as well as other desirable characteristics such as increased resistance to creep and fatigue.

The effect of the silica in the final compositions is not satisfactorily explained on the basis of mechanical reinforcing action alone. The viscosity of extremely dilute solutions of products, corrected for the mechanical effect of the silica, is markedly greater than that of the unfilled polymer prepared via an identical polymerization cycle, indicating that the weight average molecular weight of the filled polymer is considerably higher. End-group analyses indicate that the filled products also have a somewhat higher number average molecular weight, though the difference is not so pronounced. While it is not intended to limit the invention by theory, these facts create at least a strong presumption that the silica reacts chemically with the polycarbonamide-forming material, and that in addition the adjacent polymer chains bond laterally to the exposed silica surfaces by means of hydrogen bridges.

The finely divided silica which may be used in the practice of the present invention is characterized in general as consisting essentially of discrete particles having maximum dimensions of less than 10 microns and a specific surface area of at least 15 square meters per gram as determinable by nitrogen adsorption. Ordinarily the specific surface area is in the range of 15 to 700 square meters per gram, and for the production of stiff, viscous compositions is preferably in the range of 100 to 300 square meters per gram. A convenient method of determining specific surface area by nitrogen adsorption is described by P. H. Emmett, Symposium on New Methods for Particle Size Determination in the Sub-Sieve Range, A. S. T. M., March 4, 1941, page 95.

Suitable silica may be supplied in the form of sols or suspensions containing discrete dense particles having average dimensions of less than about 200 millimicrons. Alternatively, it may be supplied in the form of powders or slurries of powders consisting of porous coherent aggregates of such dense particles. Ordinarily the dimensions of the dense particles in either case, as determinable under the electron microscope, are in the range of 5 to 200 millimicrons, and for the production of the stiff viscous compositions of the present invention preferably average in the range of 10 to 30 millimicrons. Ordinarily the dimensions of the porous coherent aggregates of such dense particles are in the range of 0.2 to 10 microns or are readily broken down in fluid media to aggregates of such size. For the production of the stiff viscous compositions of the present invention, the porous coherent aggregates preferably have an average pore diameter of at least 4 millimicrons, as determinable from nitrogen adsorption isotherms.

Choice between the smaller discrete particles and the larger porous aggregates in a particular case depends principally upon the intended use of the silica-filled composition and upon the relative convenience of the procedure necessary to effect incorporation of the silica without sedimentation or agglomeration. The more versatile compositions are those containing the smaller discrete dense particles, since by reason of their greater homogeneity such compositions are readily formed into fine filaments or thin films or other articles having a small dimension which nevertheless manifest uniformly high strength and toughness. Where the composition is to be formed into relatively thick or massive articles the larger particles having maximum dimensions of up to about 10 microns may afford a sufficient degree of homogeneity.

Insofar as convenience of incorporation is concerned, with the larger particles no particular precautions are necessary to avoid agglomeration but is usually necessary to provide some sort of mechanical agitation in order to prevent sedimentation. On the other hand, with the smaller particles, it is usually unnecessary to provide mechanical stirring but special precautions are necessary to avoid agglomeration. Accordingly in particular cases the inconvenience of taking special precautions to maintain specific conductance below $2.3 \times 10^{-3}$ mho/cm. as required in the special practice of the present invention may outweigh the disadvantages of alternative procedures.

When using the smaller particles it is essential that these be supplied in a form sufficiently free of conducting impurities to avoid agglomeration. This requirement is satisfied by the use of deionized silica having a specific conductance in water of less than $5 \times 10^{-4}$ mho/cm. as measured at 28° C. in a silica-water mixture containing 10 percent silica by weight. Preferably the silica used is deionized regardless of particle size.

Suitable silica whether in discrete or aggregate form may be obtained in various ways, conveniently by processes involving neutralization of the alkali metal ions in an aqueous alkali metal silicate solution, and controlled building up of the particles so produced either to form sols or suspensions of discrete dense particles in the desired size range, or to form suspensions or slurries containing coherent porous aggregates of such particles. Deionization may be accomplished for example by washing, by dialysis, or by ion exchange treatment of the products. An especially suitable process for preparing sols containing discrete dense particles in the desired size range is disclosed in U. S. Patent 2,574,902. Deionization of such sols is conveniently accomplished by subjecting them to successive contact with a cation exchanger and an anion exchanger. If desired, such deionized sols may be storage-stabilized, as for example by the addition of small amounts of sodium hydroxide as disclosed in U. S. Patent 2,577,485. Methods of preparing suitable porous coherent aggregates are disclosed under the heading "The Material Esterified" in U. S. Patent 2,657,149. It is also possible to use the esterified hydrophobic siliceous substrates described in the last mentioned patent, although ordinarily the unmodified aggregates are preferred because they are more readily dispersed in aqueous media.

The amount of silica used depends upon the properties it is desired to impart to the final resin composition. For the conventional purposes of the prior art such as improving drawability, enhancing dye receptivity, or delustering, the especially finely divided silica is ordinarily used in amounts of from about 0.005 to about 0.5 percent or more by weight of the final composition. For increasing stiffness and melt viscosity according to the teachings of the present invention, the amount is in the range of about 2 to about 20 percent by weight of the final composition, exact amounts depending upon the extent of modification desired and the specific surface area of the silica. In general for this purpose the silica is supplied in amount sufficient to provide a total siliceous surface of at least 3 square meters per gram of final composition.

The term "polycarbonamide-forming substance" as used herein refers to substances which are capable of being polymerized to form linear polymers having recurring units of formula

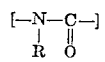

where R is hydrogen or a monovalent hydrocarbon radical, as integral parts of the main polymer chain, the average number of carbon atoms separating the amide groups being at least two. In general resins prepared from these substances have an inherent viscosity of at least about 0.4, where inherent viscosity is defined as $\ln N_{rel.}/C$, $N_{rel.}$ being the viscosity of a dilute (e. g. 0.5 g./100 cc.) solution of the polymer in meta-cresol, divided by the viscosity of meta-cresol in the same units and at the same temperature (e. g. 25° C.) and C being the concentration of the polymer in grams per 100 cc. of solution. Polycarbonamide-forming substances of this type, and methods of preparing polymers from them, are disclosed in numerous U. S. Patents, as for example, 2,071,250, 2,071,253, 2,130,948, 2,163,636 and 2,241,322.

In those aspects of the present invention wherein low specific conductance is required, a preferred class of polycarbonamide-forming substances comprises those which dissolve in thrice their weight of water, at temperatures below about 160° C., to form fluid aqueous solutions having a specific conductance of less than $2.3 \times 10^{-3}$ mho/cm. A particularly preferred group of polycarbonamide-forming substances within this class consists of the polycaproamide-forming monomers, i. e., those capable of forming polymers consisting essentially of recurring units of formula

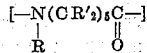

wherein R is hydrogen or a monovalent hydrocarbon radical and all the R' groups except at most one are hydrogen and the remaining R' group is hydrogen or a monovalent hydrocarbon radical. Examples of monomers within this group include 6-caprolactam, 5-aminocaproic acid, N-methyl-5-aminocaproic acid, ethyl-5-aminocaproate, 3-ethyl-5- aminocaproic acid, and the like. An especially preferred substance is 6-caprolactam, i. e., the cyclic amide of epsilon aminocaproic acid, inasmuch as it appears to exert a positive stabilizing action on the silica particles. Examples of other substances within this class include low molecular weight polymers of dibasic acids and diamines, aminoacids, dibasic acids and amino alcohols, and the like.

Referring now to the fluid aqueous dispersions containing dissolved polycarbonamide-forming substance and finely divided silica substantially entirely in the form of discrete particles having a maximum dimension of less than about 200 millimicrons, in preparing these dispersions deionized silica sol, polycarbonamide-forming substance and water are mixed while maintaining the specific conductance of the mixture below $2.3 \times 10^{-3}$ mho/cm. The specific conductance of the mixture depends largely upon the particular polycarbonamide-forming substance used, the amount of dissolved conducting impurity and the amount of water present, and accordingly measures necessary to control specific conductance at an acceptably low level involve these factors. Thus when using polycarbonamide-forming substances or low molecular polymers which also form fluid aqueous solutions having a specific conductance well below the prescribed limit at all concentrations, sufficiently low specific conductance may be maintained for example by avoiding the introduction of conducting impurities with the several components, or by adding enough water to offset the effect of such impurities. In general, the soluble salts containing polyvalent cations or anions have a more pronounced effect than salts containing monovalent cations and anions, and the former therefore are particularly avoided. With other polycarbonamide-forming substances which form solutions having a specific conductance which exceeds the prescribed limit at some concentrations above about 25 percent, a sufficiently low specific conductance may be maintained by including sufficient water and avoiding introduction of conducting impurities. Advantageously, with the latter substances the amount of water added is not substantially more than necessary, in order to minimize the sacrifice in polymerization rate which accompanies excessive dilution.

Ordinarily the total amount of water employed is at least about 15 percent by weight of the mixture, in order to provide an aqueous solution which is fluid enough to allow easy uniform distribution of the silica particles. In effecting uniform distribution of the silica, a convenient procedure involves warming the several ingredients together so as to form a homogeneous aqueous phase. Stirring is usually unnecessary, although it may be helpful in hastening dissolution.

Other ingredients may also be included in these fluid aqueous dispersions to the extent that they do not cause an increase in specific conductance beyond the prescribed limit. Examples of other substances which may be thus included comprise antifoaming agents, dispersing agents, color stabilizers, heat stabilizers, viscosity stabilizers, catalysts, other fillers, plasticizers, and the like. Small amounts of a diamine or dibasic acid or other suitable substance may also be included so as to offset any end-group unbalance which may result from reaction of the polycarbonamide-forming substance with the silica. Protective colloids are preferably excluded however, inasmuch as they tend to decompose at elevated temperatures and leave undesirable bubbles or voids in polymerized products prepared from dispersions containing them.

The dispersions prepared under the aforesaid conditions contain the silica uniformly distributed substantially entirely in the form of discrete unagglomerated ultimate particles, as determined by microscopic examination. They are stable in that they may be heated to polycarbonamide-forming temperatures, i. e., ordinarily above about 160° C. and preferably 200-250° C. without agglomeration of the silica, provided their specific conductance is continuously maintained below $2.3 \times 10^{-3}$ mho/cm. With dispersions containing polycarbonamide-forming substances which manifest specific conductances well below the prescribed limit at all concentrations and at temperatures up to 250° C., ordinarily no particular precautions are necessary to maintain low specific conductance other than to avoid the introduction of conducting impurities. On the other hand with dispersions containing more strongly conducting substances, or which contain other conducting materials so as to approximate the aforesaid limit of specific conductance, extra water may be included to compensate for increased conductance at elevated temperatures, the water being retained until the polymerization reaction has proceeded sufficiently to cause a decrease in specific conductance. Preferably in any case, however, the heating to polycarbonamide-forming temperatures is conducted in a closed vessel with retention of water until the bulk of the polycarbonamide-forming substance has polymerized. It is a particular advantage of this procedure that no stirring is necessary in order to prevent settling out of the silica. With larger silica particles, comparatively rapid stirring may be necessary to prevent settling. However, slow stirring may be advantageous in some instances in order to facilitate heat transfer, and has no deleterious aspect other than the inconvenience and expense of using a stirred polymerization vessel.

After the dispersion has been heated to polycarbonamide-forming temperatures, the resulting mass is further heated under conditions effective to drive off water and continue the polymerization. In the usual case, the total contribution of the polycarbonamide-forming substance to specific conductance steadily decreases as the polymerization reaction proceeds, so as to at least partially offset any tendency for specific conductance of the mass to increase by reason of water removal, with the net result that the specific conductance of the mass remains below $2.3 \times 10^{-3}$ mho/cm. during this stage of operation. Specific conductance may exceed this value following heating to such temperature however without adverse results inasmuch as the tendency of the silica particles to agglomerate is then minimized by the increasing viscosity of the mass. In general, removal of the bulk of the water is effected by venting it as steam from the reaction vessel while maintaining the mass under a pressure in the range of 180 to 300 p. s. i. g. in order to continue the polymerization at temperatures of 180 to 300° C.

Following removal of the water the mass is further heated until the polymer reaches an inherent viscosity of at least 0.4, and preferably 0.9 or more for the development of optimum physical properties. As previously indicated the final products contain the silica uniformly distributed within the polymer mass and substantially entirely in the form of discrete unagglomerated particles, and possess remarkably improved physical properties. With the polycaproamide compositions, further improvement may frequently be obtained by extracting the powdered products with boiling water to remove low molecular weight water soluble fractions.

Various other methods of polymerizing polycarbonamide-forming substances in the presence of finely divided silica having a specific surface area of at least 15 square meters per gram so as to obtain desirable products having increased stiffness and melt viscosity will be apparent to those skilled in the art, in the light of the foregoing remarks. One preferred procedure involves adding an aqueous slurry of silica in the form of finely divided particles having maximum dimensions in the range of 0.2 to 10 microns, and the prescribed surface area, to a fluid aqueous mass of polycarbonamide-forming substance while it is polymerizing, but before any marked increase in the viscosity of the mass has taken place, as disclosed in the aforementioned U. S. Patent 2,278,878. Advantageously, however, a stirred reaction vessel will be used, inasmuch as otherwise these supercolloidal particles tend to settle out during the polymerization reaction, leading to non-uniform products.

Under these conditions control of specific conductance is not critical, but it is nevertheless desirable to employ deionized silica and to avoid the unnecessary introduction of conducting impurities if optimum results are to be achieved. The best products obtained in this manner are somewhat less versatile than the earlier described silica-filled compositions, but are nevertheless valuable in many applications where maximum modification of physical properties is not essential, and when they are to be fabricated into fairly massive shapes.

The invention is more particularly described and explained by means of the following examples, which however are not intended to limit the scope of the invention. In the examples, all parts are by weight unless otherwise specified.

*Example 1.*—Mixtures are prepared by diluting deionized aqueous silica sol with aqueous polycarbonamide-forming substances and the effect on specific conductance and agglomeration is determined. The sol is one prepared by the process of Bechtold and Snyder U. S. Patent 2,574,902 and deionized by successive treatments with cation and anion exchangers. The sol contains about 29 percent by weight of colloidal silica in the form of discrete dense amorphous spheres having an average diameter of about 17 millimicrons and a specific surface area, as measured by nitrogen adsorption on the dried particles contained from evaporation of an acidified sample of about 160 square meters per gram. The specific conductance of the sol as measured at 10 percent silica and 28° C. is about $1.5 \times 10^{-4}$ mho/cm. It is observed that addition of even very small amounts of polyhexamethylene diammonium adipate, on the order of 0.5 percent of the total, increases the specific conductance to $2.3 \times 10^{-3}$ mho/cm. and causes immediate extensive agglomeration of the silica. On the other hand addition of 6-caprolactam or 5-aminocaproic acid, regardless of the amount added, provides mixtures having a specific conductance of very well below $2.3 \times 10^{-3}$ mho/cm. and showing no evidence of settling or agglomeration of the silica as determined by microscopic examination at 2000 diameters on the mixtures after allowing them to stand 24 hours. Moreover addition of polyhexamethylene diammonium adipate to the aqueous caprolactam-containing mixture causes no immediate agglomeration, and only slight agglomeration of the silica after 24 hours even though the specific conductance is thereby increased to $4.3 \times 10^{-3}$ mho/cm. Addition of amounts sufficient to increase specific conductance to $8.4 \times 10^{-3}$ causes only slight agglomeration on mixing. The two mixtures just described contain 7 percent silica, 27 percent 6-caprolactam, and 5.4 and 11% of polyhexamethylene diammonium adipate, respectively, the balance being water.

*Example 2.*—Seven hundred fifteen parts of polymer-grade 6-caprolactam are added to 259 parts of a deionized aqueous silica sol containing 75 parts (29 percent) of silica in the form of discrete dense amorphous spheres having an average diameter of about 17 millimicrons and a specific surface area, as measured by nitrogen absorption on the dried particles obtained from evaporation of an acidified sample, of about 160 square meters per gram. The specific conductance of the sol as measured at 10 percent $SiO_2$ and 28° C. is about $1.5 \times 10^{-4}$ mho/cm. The sol is one prepared by the process of Bechtold and Snyder U. S. Patent 2,574,902 and deionized by successive treatments with cation and anion exchangers.

The mixtures are warmed in a steam bath until liquid and 54 parts of distilled water are added to give a fluid, aqueous, homogeneous clear dispersion. The dispersion is charged to an electrically-heated, Dowtherm-jacketed, aluminum-lined, stirred autoclave, blanketed with nitrogen, and subjected to the following typical polymerization cycle:

| Period, minutes | Temperature, 0° C. | Pressure | Agitation, R. P. M. | Remarks |
|---|---|---|---|---|
| 70–115 | To 195–225 | To 250 p. s. i. g | 0–2 | Retaining water. |
| 15–165 | To 235–250 | 250 p. s. i. g | 0–2 | Bleeding off steam. |
| 80–145 | To 255–275 | To 0 p. s. i. g | 0–2 | Reducing pressure. |
| 10–35 | To 255–270 | To 80 mm./Hg | None | Applying vacuum. |
| 30–35 | At 255–270 | 80 mm./Hg | None | Holding. |

A small amount of 6-caprolactam is distilled over with the steam. During the entire operations of mixing, heating, and polymerizing, the specific conductance of the mixture remains well below $2.3 \times 10^{-3}$ mho/cm. After the polymerization cycle is completed the vacuum is broken with nitrogen and the residue is allowed to cool. The product is a tough white mass containing about 10 percent silica by weight and showing no evidence of sedimentation or agglomeration of the silica. A sample of the product, hereinafter designated II–B, is chilled, cut to a fine powder, dried, and press-molded at 270° C. to stiff, tough, strong, transparent cold-drawable films 4 mils thick. Examination of the films, undrawn and drawn 2.5 times original length, at 2000 diameters' magnification, reveals no silica particles of visible size, i. e., all particles are submicroscopic at this magnification, appearing only as a uniform grey background. A further sample of the powder is ashed and the residue is examined under the electron microscope. The silica particles are found to be of the same size and state of aggregation as those obtained by evaporation of an acidified sample of the original sol, i. e., discrete dense spherical particles having an average diameter of about 17 millimicrons and being substantially free of particles larger than about 30 millimicrons.

Additional runs are made in similar fashion to prepare products containing no silica, and 2 and 20 percent 17 millimicron silica, hereinafter designated II, II–A, and II–C, respectively. Samples of the II and II–B powder are extracted for 24 hours with boiling water, and then dried. These samples are hereinafter designated II–Ex and II–B–Ex. Further characterization of these products is shown in Table I hereinafter.

In a preparation which is identical with that of II–B, except that there is used a similar but undeionized sol containing appreciable amounts of polyvalent metal cations and sulfate anions, and having a specific conductance of about $5 \times 10^{-3}$ mho/cm. as measured at 10 percent $SiO_2$ and 28° C., the silica agglomerates and settles out during the polymerization reaction, leaving a patently unhomogeneous product which is brittle and weak, and contains a visible concentration of silica particles in the lower part of the solid mass.

*Example 3.*—Seven hundred eighty-five parts of polymer-grade 6-caprolactam are dissolved in 135 parts of distilled water mixed with 141.5 parts of deionized aqueous silica sol containing 15 parts $SiO_2$ (10.6%) of silica similar to that of Example 2 except that the mean diameter of the particles is about 200 millimicrons and the specific surface area as determined by nitrogen adsorption is about 20 square meters per gram. The mixture is clear and homogeneous, showing no sign of precipitation or agglomeration of the silica. The mixture is processed in essentially the fashion of Example 2 to give a tough strong white uniform product containing about 2 percent silica by weight and showing no evidence of precipitation or agglomeration of the silica. This product is hereinafter designated III–A.

Similar runs are made to prepare products containing 10 and 20 percent $SiO_2$ hereinafter designated III–B and III–C, respectively. Characterization of these materials is shown in Tables I and II hereinafter.

*Example 4.*—Six hundred twenty-four parts of polymer-grade 6-caprolactam, 208 parts of water and 12 parts of an organophilic silica powder consisting of a siliceous substrate modified by reaction with n-butyl alcohol by the process of U. S. Patent 2,657,149 supra, are mixed in a Waring Blendor and charged to an autoclave. The silica powder is an essentially ion-free material consisting of aggregates having maximum dimension of 1 to 10 microns and a specific surface area of about 250 square meters per gram, the aggregates being porous networks of dense amorphous spheres having an average diameter of about 20 millimicrons loosely bound to give an average pore diameter of greater than 4 millimicrons.

The charge is processed by a procedure essentially the same as that of Example 2 except that a stirring rate of about 10 R. P. M. is used in order to distribute the powder uniformly within the mass during the early stages of polymerization. The product is a tough white uniform mass containing about 2 percent silica by weight and showing no evidence of sedimentation or further agglomeration of the silica.

A similar run is made to prepare product containing 10 percent $SiO_2$. Characterization of these materials hereinafter designated IV–A, and B respectively, is shown in Table II.

*Example 5.*—Seven hundred eighty-five parts of polymer-grade 6-caprolactam, 261 parts of water and 15 parts of milled glass fiber having fiber length in the range of 25 to 400 microns, an average diameter of 8–10 microns and a specific surface area of considerably less than 15 square meters per gram are thoroughly mixed in a Waring Blendor to form a uniform liquid mixture. The milled glass fiber is a product of the Owens-Corning Fiberglas Co. and is pretreated for use by baking in an air oven at 700° F. for several hours to remove organic sizing, and subsequently thoroughly washed with distilled water to remove electrolytes. The blended mixture is processed in essentially the same manner as that of Example 2 except that a stirring rate of about 10 R. P. M. is used to maintain uniform distribution of the fibers, to give a tough strong white product containing about 2 percent milled glass fiber by weight, and showing no evidence of sedimentation or agglomeration of the fibers.

Similar runs are made to prepare compositions containing 10 percent milled glass fiber. Further characterization of the products under the designations V–A, and V–B, respectively, is shown in Table II hereinafter.

*Example 6.*—A product prepared according to Example 2, containing 10 percent $SiO_2$, is chilled, cut to a fine powder, and dried 24 hours under vacuum at 90° C. The powder is charged to an electrically heated horizontal screw-extruder fitted with a die and mandrel adapted to produce tubing of 0.25 inch internal diameter and 0.025 inch wall thickness. The material is readily melt-extruded using a rear barrel temperature of about 280° C., a forward barrel temperature of about 270° C., and a die temperature of 260° C., and the extrudate quenched in a water trough spaced from the die. The extrudate does not drip or drool from the die, nor does the tubing show any tendency to collapse after extrusion. In a comparable run, similarly prepared unfilled polymer shows a pronounced tendency to drip and collapse at the minimum temperatures necessary to satisfactory flow.

TABLES I AND II

Samples of the designated compositions of the preceding examples are chilled and cut to fine powders which are dried overnight in a vacuum oven. Tests on samples of the dried powder are summarized in Table I. Further samples of the dried powder are injection-molded to form test bars as required for the tests summarized in Table II.

Approximate inherent viscosities are determined in accordance with the definitions hereinbefore stated, in meta cresol at 0.5 g./100 cc. and 25° C., the sample weight being on a silica-free basis, i. e., corrected for the approximate silica content. Corrected viscosities are obtained by multiplying the approximate figure by the ratio of assumed purity to true purity, where true purity takes account of the actual silica content, as determined by ashing, the water content, as determined by Karl Fischer analysis, and the monomer content, as determined by extraction with boiling water. These corrected values are sufficiently proportional to weight-average molecular weight (M. W.) for purposes of the present comparison.

(Separate determinations with 17 millimicron silica alone in meta cresol indicate that, at a concentration equal to that existing in the determination of the inherent viscosity of the 20 percent silica composition, II–C, the viscosity relative to meta cresol differs by less than 0.5 percent.)

The uncorrected number-average molecular weights ($M_n$) are determined by titration of the dried powder sample for amine and carboxyl end groups, these figures being reported as groups per $10^6$ grams of sample, and dividing $2 \times 10^6$ by the total end groups thus found. The corrected $M_n$ values are obtained by multiplying the uncorrected values by the actual percentage of polymer in the sample.

Melt viscosities are determined in a vertical extruder fitted with a weighted plunger and a standard orifice. For values in terms of apparent viscosity in poises as measured at 270° C. at a shear stress of 78.4 p. s. i. multiply the figures shown by $10^3$.

Stiffness values as indicated by flexural modulus, are determined via ASTM–D–790 at the temperatures specified. For values in p. s. i. multiply the figures shown by $10^3$.

Ultimate tensile strength in p. s. i. and percent elongation at break are determined via ASTM–D–638. Densities are in grams/cc. via ASTM–D–792–A. Izod impact strengths in foot pounds per inch of notch are determined via ASTM–D;25; "NB" in this test indicates no break occurred.

Toughness values are given as number of breaks per number of bends, as determined by the mandrel bend test described in ASTM–D–789–44T. Rockwell hardness values are "R" scale figures. Fatigue endurance figures are in p. s. i. maximum stress a standard bar withstands for $10^6$ cycles as determined on a Sonntag axial fatigue machine. Creep rates after 100 hours under stresses as shown are given in terms of mils per inch per hour, multiplied by 100.

Figures for unfilled polyhexamethylene adipamide, designated "66" and unfilled high molecular weight 6-caprolactam obtained via an extended polymerization cycle, designated "II–H," are included for comparison.

Table I.—Viscosity and analysis data

| Filler | None | | 17 millimicrons SiO₂ | | | 200 millimicrons SiO₂ | | |
|---|---|---|---|---|---|---|---|---|
| Sample | II | II-H | II-A | II-B | II-C | III-A | III-B | III-C |
| Nominal silica | 0 | 0 | 2 | 10 | 20 | 2 | 10 | 20 |
| Percent silica by ash | | | 2.08 | 10.52 | 21.21 | 1.85 | 11.58 | 20.62 |
| Percent water | 0.45 | 0.18 | 2.06 | 0.93 | 0.26 | 0.82 | 0.82 | } 4.70 |
| Percent monomer | 6.75 | 7.45 | 4.33 | 5.63 | 4.92 | 6.00 | 4.86 | |
| Percent polymer | 92.80 | 92.37 | 91.53 | 82.92 | 73.61 | 91.33 | 82.84 | 74.68 |
| Amine ends | 39 | 28.5 | 22.5 | 33 | 44 | 29 | 17 | 16 |
| Carboxyl ends | 23.5 | 25.5 | 32.5 | 13.5 | 6 | 39 | 25 | 18 |
| Total ends | 62.5 | 54 | 55 | 46.5 | 50 | 68 | 42 | 34 |
| Uncorrected $M_n$ | 32,000 | 37,040 | 36,360 | 43,010 | 40,000 | 29,410 | 47,620 | 58,820 |
| Corrected $M_n$ | 29,700 | 34,210 | 33,280 | 35,660 | 29,440 | 26,860 | 39,450 | 43,950 |
| Approx. inh. visc | 1.29 | 1.54 | 1.84 | 1.96 | 1.81 | 1.31 | 1.54 | 1.59 |
| Corrected inh. visc | 1.39 | 1.66 | 1.97 | 2.13 | 1.96 | 1.40 | 1.67 | 1.70 |
| Melt viscosity | 0.325 | 0.775 | 3.10 | 7.15 | 18.1 | 0.456 | 1.77 | 1.81 |

Table II.—Viscosity and mechanical properties

| Filler | None | | | 17 millimicron SiO₂ | | | | 200 millimicron SiO₂ | | | Silica Aggregates | | Glass Fiber | |
|---|---|---|---|---|---|---|---|---|---|---|---|---|---|---|
| Sample | "66" | II | II-EX | II-A | II-B | II-C | II-B-EX | III-A | III-B | III-C | IV-A | IV-B | V-A | V-B |
| Nominal silica, percent | | | | 2 | 10 | 20 | 10 | 2 | 10 | 20 | 2 | 10 | 2 | 10 |
| Approx. inh. visc. after molding | 1.2 | 1.27 | 1.36 | 1.70 | 1.61 | 1.54 | 1.87 | 1.30 | 1.50 | 1.57 | 1.52 | 1.63 | 1.02 | 1.28 |
| Percent monomer, after molding | | 6.42 | 1.06 | 4.56 | 4.53 | 4.44 | 2.12 | 5.08 | 4.97 | 3.79 | ¹5.95 | ¹6.95 | ¹6.95 | ¹6.11 |
| Density | 1.137 | 1.129 | 1.129 | 1.144 | 1.191 | 1.258 | 1.191 | 1.149 | 1.200 | | 1.144 | | | |
| Rockwell hardness, "R" | 103 | 90 | 94 | 86 | 91 | 91 | 106 | 77 | 76 | 83 | 85 | 92 | 92 | 91 |
| Izod impact strength | 1.1 | NB | 2.88 | 8.6 | 1.46 | 2.5 | 1.47 | NB | NB | NB | 2.14 | 1.03 | 3.52 | 2.19 |
| Tensile strength | 9,800 | 9,510 | 8,870 | 9,720 | 9,380 | 6,650 | 8,070 | 7,180 | 7,800 | 7,220 | 7,760 | 7,520 | 6,270 | 7,220 |
| Elongation | 230 | 230 | 253 | 187 | 173 | 180 | 140 | 223 | 236 | 130 | 180 | 140 | 170 | 170 |
| Flexural modulus: | | | | | | | | | | | | | | |
| 23° C | 175 | 86.2 | 130 | 133 | 190 | 139 | 173 | 78.1 | 68.9 | 134 | 132 | 140 | 102 | 151 |
| 50° C | 98 | 70.3 | 95 | 81.2 | 108 | 117 | 120 | 61.1 | 61.6 | 125 | 106 | 131 | | 124 |
| 100° C | 69 | 53.1 | 67 | 67 | 80 | 87.2 | 87 | 52.1 | 53.8 | 84.7 | 75 | 87 | | 102 |
| 150° C | | 43.7 | 52 | 50 | 63.5 | 74.7 | 80 | 43.3 | 43.7 | 64.4 | 57 | 48 | | 75 |
| Mandrel bend | 0/100 | 0/5 | 0/15 | 0/4 | 1/2 | 0/5 | 0/20 | 0/5 | 0/5 | 0/8 | 0/16 | 0/16 | 0/20 | 0/16 |
| Fatigue endurance limit | 3,000 | 1,950 | 2,500 | 2,200 | 2,500 | 2,250 | 3,000 | 1,900 | 2,100 | 2,200 | 2,100 | | 1,800 | |
| Creep | 1.0 | 1.2 | | 0.91 | 0.44 | 0.93 | 0.66 | 1.4 | 1.7 | | 0.83 | | 0.75 | |
| Melt visc., 270° C | 0.4 | 0.3 | | 3.1 | 7.2 | 18.1 | | 0.5 | 1.8 | 1.8 | 1.3 | 5.9 | 0.4 | 1.1 |

¹ Before molding.

It is apparent from the foregoing description and illustration that the present invention affords several advantages over the prior art. It provides a method of dispersing colloidal silica into a fluid aqueous solution of polycarbonamide-forming substance without agglomerating the silica particles, even in the absence of stirring and in the absence of protective colloids. It provides stable dispersions of colloidal silica in fluid aqueous solutions of polycarbonamide-forming substance, which may be subjected to polymerization without agglomerating the silica, to obtain final products containing the silica in especially finely divided form uniformly dispersed within a polycarbonamide resin matrix. It provides a means of enhancing certain physical properties such as stiffness and melt viscosity of polycarbonamide resins, without seriously interfering with other desirable properties such as strength and toughness. Because of their high degree of homogeneity, these compositions may be readily extruded through filters as is frequently desirable in fabrication in order to guard against foreign particles which might damage fabrication equipment, or to facilitate obtaining void-free final articles, or to prevent the introduction of unmelted portions of the resinous composition from entering the zone of final shaping. Because of their high viscosity these compositions may be readily fabricated into final articles by extrusion techniques under conditions where the less viscous compositions are not satisfactory because of their tendency to drip or deform on issuance from a die. Because of their greater stiffness, it is frequently possible to use thinner and therefore cheaper articles fabricated from them in applications where rigidity of construction is desired. Numerous other advantages will be apparent to those skilled in the art.

I claim:

A tough, fiber-forming, silica-filled polycaproamide composition having exceptional stiffness and melt viscosity, obtained by a process wherein (a) there are admixed to form a fluid mixture: water, monomer polymerizable to fiber-forming polycaproamide having recurring units of formula

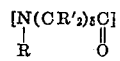

wherein R and R' are selected from the group consisting of hydrogen and alkyl of 1 to 4 carbon atoms, and each R' except at most one is hydrogen, and deionized silica having a maximum discrete particle size of less than 10 microns; and (b) the mixture is heated at a temperature in the range of 160 to 300° C. with removal of water to obtain polycaproamide, having an inherent viscosity in the range of 0.4 to 2 and containing 2 to 20 weight percent of well-dispersed finely-divided silica, said process being further characterized in that (c) the silica is supplied to the mixture in the form of particles having a specific surface area of 15 to 700 square meters per gram and in amount such that the total specific surface area of the silica supplied is at least three square meters per gram of said polycaproamide.

References Cited in the file of this patent

UNITED STATES PATENTS

| 2,163,636 | Spanagel | June 27, 1939 |
| 2,205,722 | Graves | June 25, 1940 |
| 2,278,878 | Hoff | Apr. 7, 1942 |
| 2,341,759 | Catlin | Feb. 15, 1944 |
| 2,574,902 | Bechtold et al. | Nov. 13, 1951 |
| 2,689,839 | Heckert | Sept. 21, 1954 |